(12) United States Patent
Janot et al.

(10) Patent No.: US 7,559,985 B2
(45) Date of Patent: Jul. 14, 2009

(54) INK SUITABLE FOR PRINTING SMART CARD AND PROCESS FOR PRODUCING A PRINTED SMART CARD WITH SUCH AN INK

(75) Inventors: Aurélie Janot, Montrouge (FR);
Jocelyne Chesneau, Montrouge (FR);
Hélène LeJeune, Montrouge (FR)

(73) Assignee: Axalto SA, Montrouge (FR)

( * ) Notice: Subject to any disclaimer, the term of this patent is extended or adjusted under 35 U.S.C. 154(b) by 488 days.

(21) Appl. No.: 11/303,816

(22) Filed: Dec. 15, 2005

(65) Prior Publication Data
US 2007/0138300 A1 Jun. 21, 2007

(51) Int. Cl.
*C09D 11/02* (2006.01)

(52) U.S. Cl. .............. 106/31.9; 106/31.86; 106/31.88; 106/31.92

(58) Field of Classification Search .............. 106/31.6, 106/31.86, 31.78, 31.88, 31.9, 31.92
See application file for complete search history.

(56) References Cited

U.S. PATENT DOCUMENTS

| | | | | |
|---|---|---|---|---|
| 5,961,706 A | * | 10/1999 | Bechly | 106/31.9 |
| 6,666,913 B2 | * | 12/2003 | Hirano et al. | 106/31.9 |
| 7,291,209 B2 | * | 11/2007 | Gilli | 106/31.9 |
| 2005/0078158 A1 | * | 4/2005 | Magdassi et al. | 347/100 |
| 2006/0099420 A1 | * | 5/2006 | Bujard | 106/31.9 |
| 2007/0051272 A1 | * | 3/2007 | Wheeler | 106/31.9 |
| 2007/0104663 A1 | * | 5/2007 | Henglein et al. | 106/31.9 |
| 2007/0199478 A1 | * | 8/2007 | Schlegl et al. | 106/31.9 |

OTHER PUBLICATIONS

Miraval; Borosilicate Pigments for Industrial Applications from Merck; pp. 1-14; Feb. 2004.*

* cited by examiner

*Primary Examiner*—Helene Klemanski
(74) *Attorney, Agent, or Firm*—Cohen Pontani Lieberman & Pavane LLP

(57) ABSTRACT

The invention relates to an ink providing an optical effect, when it is applied on a main surface of a smart card. Said ink comprising a mixture of a base solution and a metallic pigment, said mixture containing between 2 and 4% per weight of the metallic pigment. The ink allows to obtain smart card having an improved appearance, and particularly smart cards having a printed surface with optical effect.

5 Claims, 1 Drawing Sheet

INK SUITABLE FOR PRINTING SMART CARD AND PROCESS FOR PRODUCING A PRINTED SMART CARD WITH SUCH AN INK

FIELD OF THE INVENTION

The invention relates to an ink suitable for printing smart cards.

More particularly, the invention relates to an ink providing an optical effect, such as a pearlescent effect, when it is printed on a main surface of a smart card.

BACKGROUND OF THE INVENTION

Practically, smart cards are divided into two categories.

Smart cards of a first category use contact pads to connect electrically the microcontroller to the outside world.

Smart cards of a second category use radio frequency waves to communicate. They comprise a radio frequency microcontroller electrically connected to an antenna.

In FIG. 1, a schematic conventional contactless smart card 10 is illustrated. The manufacture of contactless smart cards is usually based on a semi-finished product often called "pre-laminated inlet" 11. The inlet is usually made of at least four layers that are laminated. These layers comprise two layers 1 and 2 of plastic sheet, made of poly-vinyl-chloride (PVC) for example, and two overlays layers 3 and 4. The inlet 11 hosts a copper wired antenna 5 connected to the contact pads of an electronic module 6, by thermo-compression welding, or other mean such as a conductive glue. Then, at least one pre-printed layer 8, 9, made of PVC for example, and at least one overlay layer 12, 13 are laminated with the inlet 11. The pre-printed design is generally made by offset printing process, for decorative or advertising purposes. The thickness of the pre-printed layers 8, 9 is generally 150 µm and the thickness of the overlays 12, 13 is generally 50 µm.

FIG. 2 is a schematic conventional smart card 20 with contact pads 21 which are substantially flush with one of the main surfaces 22 of the smart card. The manufacture of such smart cards is usually based on a plastic sheet 11, made of poly-vinyl-chloride (PVC), or acrylonitrile-butadiene-styrene (ABS) for example. The plastic sheet 11 is laminated between at least one pre-printed plastic sheet 8, 9 and two or more overlay layers 12, 13 that are generally 50 µm thick. Then, a cavity 24 is provided in the thus obtained plastic card body in order to affix an electronic module 25 in such a manner that contact pads 21 are flush with one main surface 22.

Other conventional processes may also be used to manufacture a smart card. For example, the card may be manufactured by injection, in a mold, of a molten plastic material and then, solidification and unmolding of the thus obtained card body. The printing process of the card body is then performed before the lamination process of the overlays.

In all conventional processes for producing smart cards, at least one pre-printed layer is laminated between an overlay layer and the plastic sheet constituting the card body.

Nowadays, there is a strong request for making smart cards which have an improved appearance, and particularly smart cards having a printed surface with optical effects. Namely, such optical effects are particularly requested because they give the card a very distinguishable aspect and a high promotion value that reflects a prestigious image.

In this context, it has been tried to make smart cards having a surface with a pearlescent effect. For that, pearlescent transparent varnishes that are currently commercialized have been applied on the main surface of at least one pre-printed layer constituting smart card.

However, it appears that existing pearlescent varnishes are not suitable for printing smart cards. Namely, they do not provide the requisite pearlescent effect. In fact, there is no variation of the coloration of the pigment used in the varnishes with the tilt angle of the card, so that there is no variation of the light refraction with the tilt of the card.

Moreover, the adherence of the laminated overlays on the surface of the card is bad and overlays are therefore easily delaminated or torn off.

Due to these drawbacks, the manufacture of smart cards having such printed surfaces does not satisfy customers and leads to financial losses, because of great number of wasted card, and complaint from unhappy customers.

SUMMARY OF THE INVENTION

Considering the above, a problem intended to be solved by the invention is to provide an ink suitable for coating at least one printed main surface of a smart card, in order to obtain printed main surface(s) having an optical effect, said ink allowing a variation of the coloration of the pigment when the card is bent or tilt and allowing a strong adherence of the overlays on the surface of the printed card body.

In order to solve this problem, the ink of the invention comprises a mixture of a base solution and a metallic pigment, said mixture containing between 2 and 4% per weight of the metallic pigment.

Thus, thanks to the use of a metallic pigment between 2 and 4% per weight in the base solution, overlays are not easily delaminated.

In a preferred embodiment, the metallic pigment is a powder comprising 75% per weight of Calcium-Aluminium-Borosilicate, 15% per weight of $SiO_2$, 9.3% per weight of $TiO_2$ and 0.6% per weight of $SnO_2$.

Such a pigment is sufficiently stable and does not suffer from the temperature and the pressure during the subsequent lamination process, so that its coloration may vary with the tilt of the card in such a manner that the refraction of light differs with the tilt of the card.

The base solution may be either an aqueous solution or a solvent solution.

Another problem intended to be solved by the invention is to provide a process for producing a printed smart card with optical effect on at least one of its main surfaces, said process allowing a variation of the coloration of the pigment with the tilt of the card, having a good reproducibility and allowing a strong adherence of the overlays on the surface of the printed card body.

For that, the process of the present invention comprises:
  providing a card body made of plastic material,
  providing at least one pre-printed plastic layer on at least one main surface of the card body,
  coating said at least one pre-printed layer with the ink of the present invention, and
  laminating the card body between said at least one pre-printed and coated layer and overlays layers.

In a preferred embodiment, the coating step comprises a silk-screen printing process.

BRIEF DESCRIPTION OF THE DRAWINGS

For a better understanding of the present invention, reference will now be made, by way of example, to the following description of the invention and to the accompanying drawings, in which.

DETAILED DESCRIPTION

Figure 1:
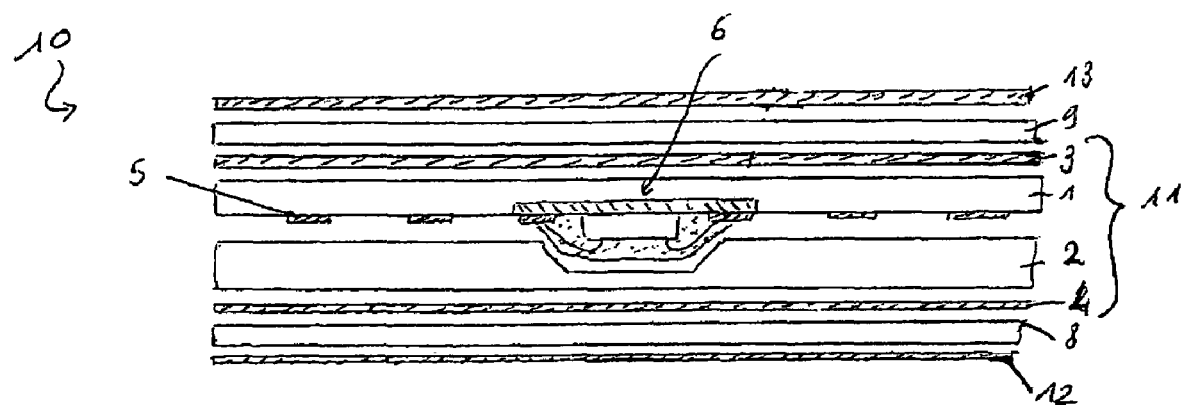
FIG. 1, already described, is a schematic cross-section illustrating a contactless smart.
Figure 2:
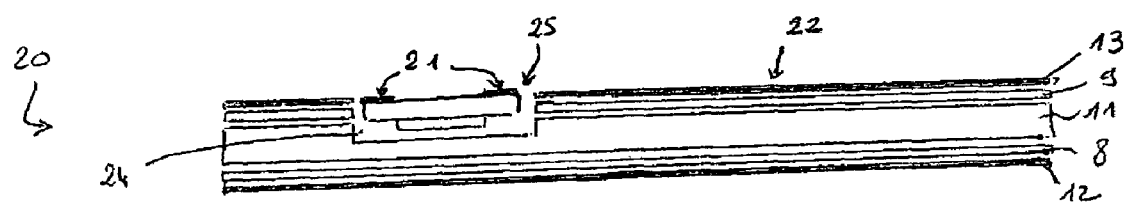
FIG. 2, already described, is a schematic cross-section illustrating a smart card having contact pads that are substantially flush with one of the main surfaces of the card body.
Figure 3:
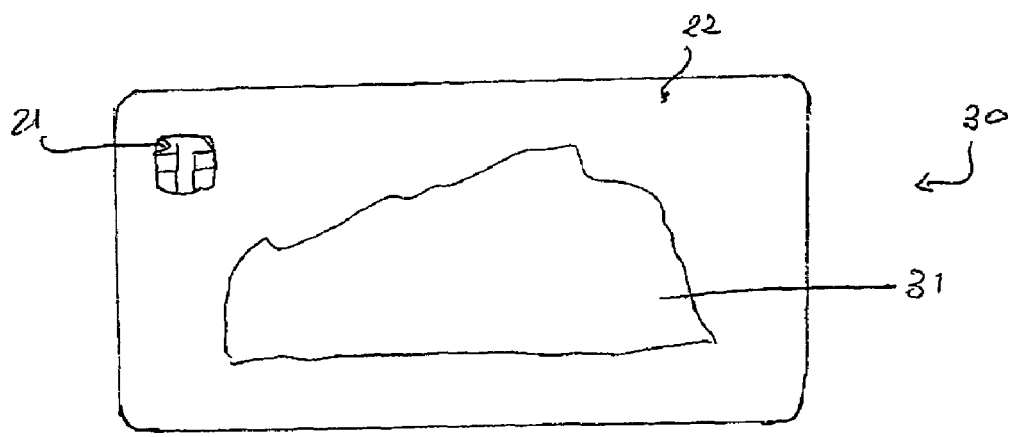
FIG. 3 is schematic front view of a smart card.

In FIG. 3, one of the main faces 22 of a smart card 30 with which contact pads 21 are flush is illustrated. The shape 31 illustrate a schematic drawing that is printed on this main face.

In order to obtain a pearlescent effect on the surface of a smart card, i.e. a pearly metallic and moving effect, the ink that is applied on the surface of the card body must have a pigment comprising particles which are transparent crystals of high refractive index. Nevertheless, the ink must be sufficiently stable in order not to suffer from the temperature and pressure during the subsequent lamination process and to allow a variation of the coloration of the pigment with the tilt of the card. The ink must also allow a strong adherence of the overlays on the mains surfaces of the card body.

For obtaining such an effect, the ink comprises a mixture of a base solution and a metallic pigment. Preferably, the proportion of the metallic pigment in said mixture must be comprised between 2 and 4% per weight. Namely, if the proportion is less than 2% per weight, there is no pearlescent effect on the surface of the card, the resulting aspect is less glitter than the requisite aspect and is not accepted by customers. On the other hand, if the proportion of metallic pigment is more than 4% per weight, there is too much metallic particles, so that overlays do not adhere sufficiently on the printed surface (s) of the card and are easily delaminated.

In fact, base solution may be either an aqueous solution or a solvent solution.

Preferably the aqueous solution is an emulsion commercialised by FM supplier. This emulsion comprises between 0 and 5% per weight of dipropylene glycol ether acetate, between 0 and 10% per weight of N-methyl pyrrolidone, between 0 and 2% per weight of hexyl carbitol and between 0 and 5% per weight of dipropylene glycol methyl ether, a polyurethane resin and water On the other hand, the solvent solution is preferably a solvent varnish commercialized by Appolo supplier. This varnish comprises between 10 and 20% per weight of 1-ethoxy-propan-2-ol, between 10 and 20% per weight of 2(3)H-Furanone dihydro (96-48-0), between 40 and 50% per weight of Naphta solvent and a synthetic resin.

Moreover, the metallic pigment used for producing the ink is preferably a powder commercialised by Merck supplier and comprises 75% per weight of Calcium-Aluminium- Borosilicate, 15% per weight of silicon dioxide, 9.3% per weight of titanium dioxide and 0.6% per weight of tin dioxide.

Such a pigment is stable enough and does not suffer from the temperature and the pressure during the subsequent lamination process, so that the properties of the pigment are unchanged. Thus, the coloration of the pigment changes with the tilt of the finished card, so that the refraction of the light changes also depending of the tilt of the card, thus conferring to the surface of the card a visual aspect of pearlescence.

The mixture constituting the ink is well-adapted for silk-screen printing process. It cannot be used in an offset machine because metallic pigment could damage such a machine.

The adjustment of the proportion of the metallic pigment in the base solution mainly depends on the printing parameters and on the used base solution. Following examples are therefore given for illustration:

EXAMPLE 1

A plastic card body is made by a conventional process. The plastic material is a thermoplastic material, such as PVC for example. Then, the main surface of at least one pre-printed plastic layer, made of thermoplastic material such as PVC for example, is coated with the ink by means of a silk-screen process.

For coating the pre-printed layer of the card body with the ink, said silk-screen printing process is used with a mesh 77. In this case, if the base solution is the solvent solution, then the proportion of metallic pigment in the mixture must be of 3% per weight to obtain good results on the surface of the finished card.

After coating, the card body, the pre-printed and coated layers and overlays are laminated together.

Practically, when the mesh aperture is larger, then the proportion of pigment must be lowered and inversely.

EXAMPLE 2

In this example, all parameters are the same as in example 1, except the mesh used during the coating step.

In this case the mesh which is used is a mesh 54, which has a larger aperture than mesh 77. With such a mesh, the proportion of metallic pigment in the mixture must be of 2% per weight to obtain good results on the surface of the card.

EXAMPLE 3

In this example, all parameters are the same as in example 1, except the base solution used for the ink.

In this case the base solution is the aqueous solution. With such a base and a mesh 77, the proportion of metallic pigment in the mixture must be preferably between 3 and 4% per weight to obtain good results on the surface of the card.

Another advantageous feature of the ink of the invention is that it may be used on different plastic material that may be used for manufacturing the card body. Thus, the ink may be applied on the surface of a card body made of thermoplastic material, such as for example PVC, or ABS, or polycarbonate or polyester or polyamide or polyethylene terephtalate or an alloy of these plastic materials etc . . .

In these cases, the proportion of the metallic pigment in the ink remains the same, but some adjustments on the silk-screen machine are necessary, such as the temperature of the ovens for example.

The invention claimed is:

1. Ink suitable for coating at least one printed main surface of a smart card, said coated main surface(s) having an optical effect, wherein said ink comprises a mixture of a base solution and a metallic pigment, said mixture containing between 2 and 4% per weight of the metallic pigment, said base solution is a solvent solution comprising at least between 10 and 20% per weight of 1-ethoxy-propan-2-ol, between 10 and 20% per weight of 2(3)H-furanone dihydro, between 40 and 50% per weight of naphta solvent and a synthetic resin.

2. The ink of claim 1, wherein the metallic pigment is a powder comprising 75% per weight of Calcium-Aluminium-Borosilicate, 15% per weight of $SnO_2$, 9.3% per weight of $TiO_2$ and 0.6% per weight of $SnO_2$.

3. Process for producing a printed smart card with optical effect on at least one of its main surfaces, said process comprising the steps of:
 providing a card body made of plastic material,
 providing at least one pre-printed plastic layer on at least one main surface of the card body,
 coating said at least one pre-printed layer with the ink of claim 1, and
 laminating the card body, said at least one pre-printed and coated layer and overlays layers together.

4. Process of claim 3, wherein the coating step comprises a silk-screen printing process.

5. Process of claim 3, wherein the plastic material of the pre-printed plastic layer is a thermoplastic material.

* * * * *